United States Patent
Dosenbach et al.

(10) Patent No.: US 9,227,511 B1
(45) Date of Patent: Jan. 5, 2016

(54) POSITIONABLE SHIFTER SYSTEM

(71) Applicant: The Braun Corporation, Winamac, IN (US)

(72) Inventors: Eric Sajed Dosenbach, Winamac, IN (US); Christopher C. Wegner, Winamac, IN (US); Adam Wojdyla, Winamac, IN (US); Timothy S. Barber, Logansport, IN (US)

(73) Assignee: The Braun Corporation, Winamac, IN (US)

( * ) Notice: Subject to any disclaimer, the term of this patent is extended or adjusted under 35 U.S.C. 154(b) by 0 days.

(21) Appl. No.: 14/525,521

(22) Filed: Oct. 28, 2014

(51) Int. Cl.
*B60K 20/02* (2006.01)
*F16H 59/02* (2006.01)

(52) U.S. Cl.
CPC ............ *B60K 20/02* (2013.01); *F16H 59/0213* (2013.01)

(58) Field of Classification Search
CPC ............................ B60K 20/02; F16H 59/0213
USPC ....................................................... 180/334
See application file for complete search history.

(56) References Cited

U.S. PATENT DOCUMENTS

| | | | |
|---|---|---|---|
| 6,883,871 B2 | 4/2005 | Nae et al. | |
| 7,014,255 B2* | 3/2006 | Amamiya | B60N 2/143 180/329 |
| 7,571,661 B2* | 8/2009 | Blondeel | B60K 20/04 74/473.1 |
| 7,874,603 B2 | 1/2011 | Stoner | |
| 2006/0042857 A1* | 3/2006 | Catton | B60N 2/4693 180/334 |

* cited by examiner

*Primary Examiner* — Faye M Fleming
(74) *Attorney, Agent, or Firm* — Taft Stettiuius & Hollister LLP; Stephen F. Rest

(57) ABSTRACT

A positionable shifter assembly for use in a vehicle adapted to transport a physically limited person, wherein a front passenger compartment includes a dashboard, a driver side compartment, a passenger side compartment, and a vehicle shifter disposed between the driver side compartment and the passenger side compartment. The positionable shifter assembly includes a platform configured to support the vehicle shifter, wherein the platform is configured be positioned at a plurality of locations within the front passenger compartment. A securing mechanism is the configured to secure the positionable shifter assembly at one of the plurality of locations within the vehicle.

20 Claims, 9 Drawing Sheets

POSITIONABLE SHIFTER SYSTEM

FIELD

The present application relates to a passenger vehicle for transporting one or more passengers, and more particularly to a passenger vehicle which is retrofitted for transporting one or more passengers seated in a wheelchair.

BACKGROUND

Automobile manufacturers do not currently mass-produce passenger vehicles specifically designed to transport passengers having physical limitations, either as a driver or as a non-driving passenger. Consequently, mass-produced passenger vehicles are modified, or retrofitted, by a number of aftermarket companies dedicated to supplying vehicles to physically limited passengers. Such vehicles can be modified by removing certain parts or structures within a vehicle and replacing those parts with parts specifically designed to accommodate the physically limited passenger. For example in one configuration, a van is retrofitted with a ramp to enable a physically limited individual using a wheelchair to enter the vehicle without the assistance of another individual.

Other known products for retrofitting a vehicle, such as a van, include wheel chair lifts, lift platforms, and lowered floor surfaces. In some instances, a door of an original equipment manufacturer (OEM) van is enlarged or otherwise modified to permit entry of the physically limited individual through what is known as the assisted entrance. Once inside the van, individuals who use the assisted entrance are often located in a rear passenger compartment of the van adjacent to or behind the assisted entrance.

While these seating locations provide for the transport of the physically limited individual, such locations do not always lend themselves to providing good sightlines which enable the passenger to see a complete view of the road and the surrounding scenery. Consequently, what is needed is a modification to an OEM vehicle which allows the physically limited individual seated in a wheelchair to be located in the front passenger compartment, either as the passenger or as the driver, particularly in an OEM vehicle having a center mounted vehicle shifter or center mounted console.

SUMMARY

In one embodiment, there is provided a positionable shifter assembly for supporting a shifter in a front passenger compartment of a vehicle. The shifter assembly includes a bracket assembly configured to be stationarily fixed in the front passenger compartment of the vehicle wherein the bracket assembly defines a first axis. A carriage assembly is operatively connected to the bracket assembly and is adapted to support the shifter for movement along a second axis inclined with respect the first axis. A securing mechanism is operatively connected to the carriage assembly and is configured to secure the carriage assembly to the bracket assembly at a desired location along the second axis.

In another embodiment, there is provided a shifter assembly for use in a vehicle adapted to transport a physically limited person, wherein a front passenger compartment includes a dashboard, a driver side compartment, a passenger side compartment, and a vehicle shifter disposed between the driver side compartment and the passenger side compartment. The shifter assembly includes a shifter support assembly including a platform configured to support the shifter, wherein the platform is configured be positioned at a plurality of locations within the vehicle. A securing mechanism is operatively connected to the shifter support assembly and is configured to secure the shifter support assembly at one of the plurality of locations within the vehicle.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
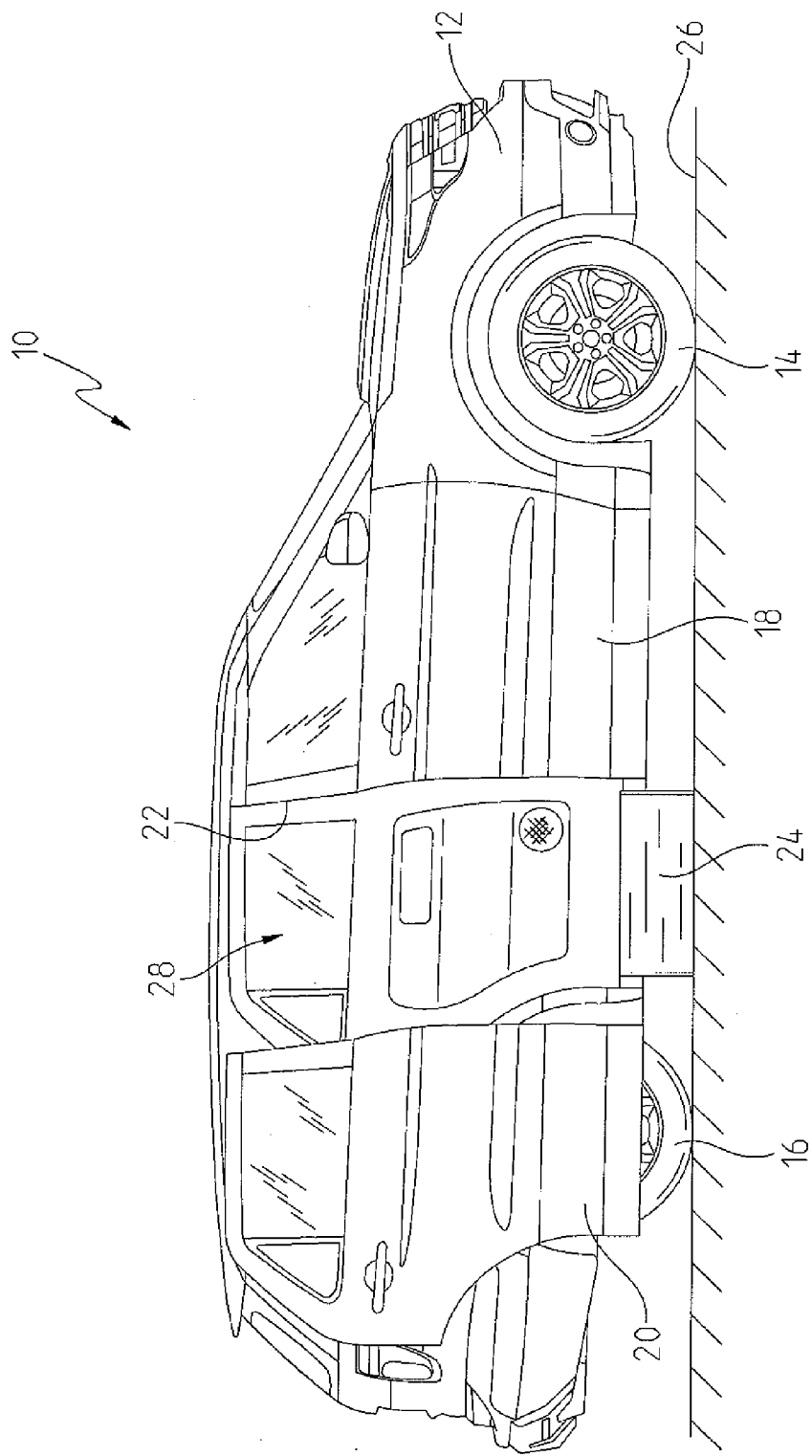
FIG. 1 illustrates an elevational side view of a sport utility vehicle including an access ramp.

FIG. 1 illustrates a sport utility vehicle (SUV) 10 available from any number of United States and foreign manufacturers. In the illustrated embodiment, the SUV, also called a crossover vehicle, includes a unibody construction, but other SUV's having a frame on body construction, are also included in the present disclosure. Consequently the use of SUV herein is includes all types and kinds of sport utility vehicles constructed with a body on frame construction, a unibody construction, or other constructions. In addition, while the SUV is illustrated in FIG. 1, the present disclosure is directed to all passenger vehicles carrying one or more passengers.

FIG. 1 illustrates the SUV 10 including a body 12 operatively coupled to front wheels 14 and rear wheels 16. The SUV 10 includes a unibody construction. A first passenger side door 18 is located between the front wheels 14 and rear wheels 16 and provides access to a passenger for sitting in a front seat of the vehicle adjacent to the driver. In this position, the passenger has a clearer view of the road when compared to sitting in a middle row or back row of seats of the vehicle.

The SUV 10 has been modified to include a second passenger side door 20 coupled to the unibody frame through a mechanical linkage (not shown). In other embodiments, the side door 20 is coupled to the unibody frame through a sliding mechanism. In this embodiment, the second passenger side door has been modified to slide along a track (not shown) as opposed to the manufacturer supplied door which is hinged to swing away from the vehicle, as is understood by those skilled in the art. In addition to modifying the door 20 to slide along the track, an opening 22 to the interior, in some embodiments, is modified or widened to provide access to a passenger seated in a wheelchair. The opening is defined on the sides thereof by an edge of the door 20 and the edge of the door 18. The vehicle is further modified to include a ramp assembly 24 which provides rolling access of the wheelchair from pavement 26 into an interior 28 of the vehicle 10. The ramp assembly 24 is installed at the opening 22 and is movable between the interior of the vehicle, where it is stored in some embodiments, and to the exterior for wheelchair access.

In known modified vehicles, such as modified vans, the middle row of seats is removed from the manufacturer supplied vehicle to enable access to a wheelchair supporting a passenger. Once the wheelchaired passenger moves into the interior of the vehicle, the passenger or caregiver locates the wheelchair in the middle portion of the interior behind the driver and passenger seats of the front row. While the wheelchaired passenger is readily and safely transported by the vehicle when located at this position, the passenger can have difficulty communicating with the driver and difficulty viewing the road and surrounding scenery. This location is therefore often frustrating for many individuals, particularly those individuals who led active lives prior to receiving their disability and continue to be actively involved. As used herein, wheelchaired passenger is used to indicate that the individual is making use of a wheelchair, whether that use is temporary or permanent.

Figure 2:
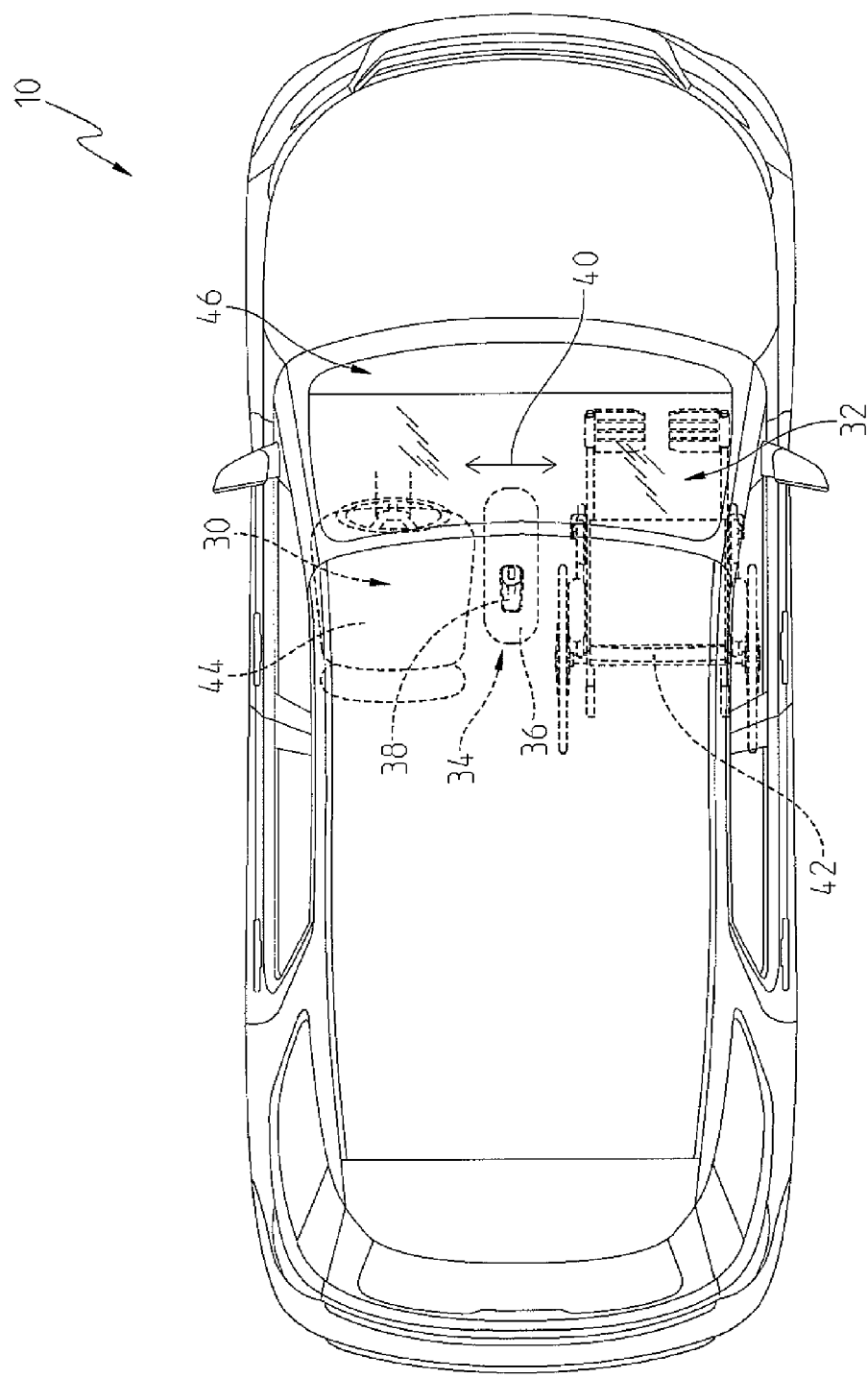
FIG. 2 illustrates a top plan sectioned view of a sport utility vehicle including a positionable shifter assembly.

Over the past few years, the number of wheelchaired individuals who desire to lead full active lives has increased. To accommodate such individuals, the SUV has become a preferred vehicle of choice, particularly with military veterans who received disabilities during their tours of duty. Consequently, the SUV 10 is further modified or retrofitted as illustrated in FIG. 2 to provide a location having sufficient space for the wheelchaired passenger in the front passenger location next the driver. To retrofit the vehicle 10, a manufactured SUV is purchased from a dealer or directly from the manufacturer and the manufacturer supplied center console is disassembled or removed from the vehicle. In particular, the original shifter is separated from other manufacturer supplied components and reused and located in the front passenger compartment in a positionable shifter assembly 34, as described herein.

As can be seen in FIG. 2, a driver side location 30 and a passenger side location 32 are located in a front passenger compartment on either side of the positionable shifter assembly 34, which includes a center console 36 and a shifter 38. In this embodiment, the shifter assembly 34 is configured to move along a line 40 such that the shifter assembly 34 is positionable within the front passenger compartment to either increase or decrease the amount of usable floor area in either of the driver side location 30 and the passenger side location 32. When moved closer to the driver side location 30, the passenger side position 32 is enlarged sufficiently to accommodate a wheelchair 42. In another embodiment, a driver seat 44 is removed and the shifter assembly 34 is moved toward the passenger side position 32 to accommodate the wheelchair 42 when located in the driver side location 30.

Figure 3:
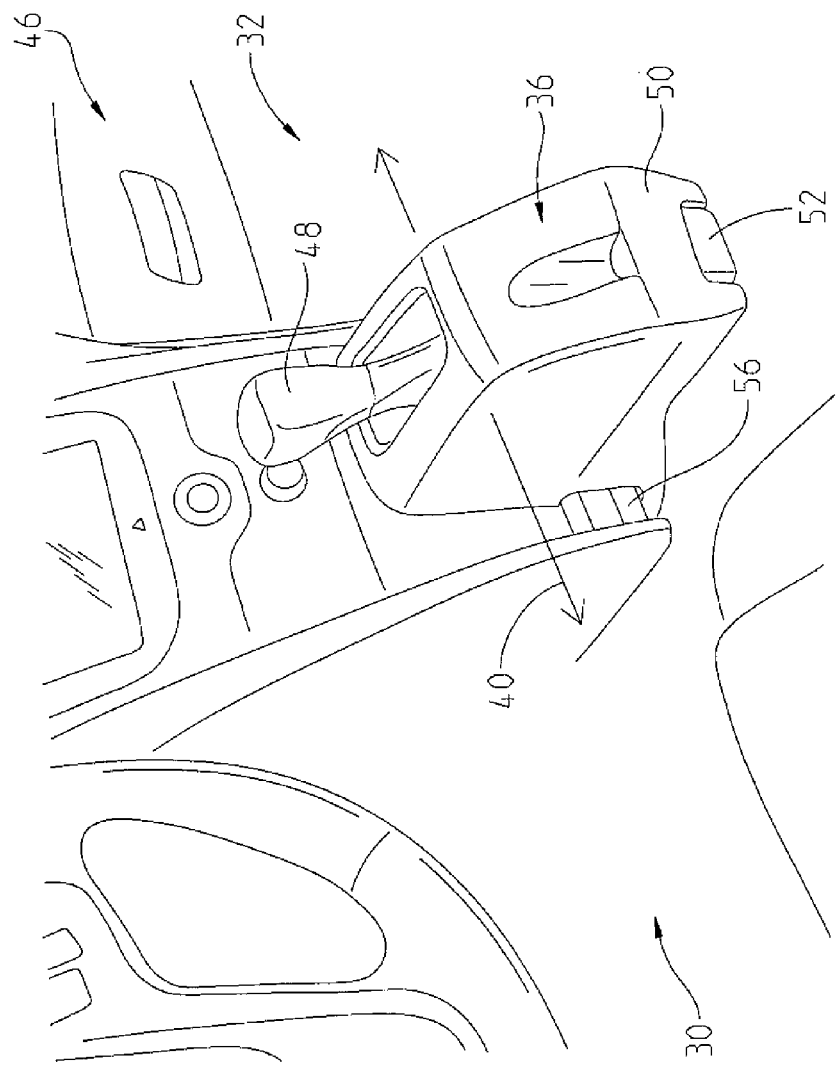
FIG. 3 illustrates a positionable shifter assembly located adjacently to a dash of a vehicle.

FIG. 3 illustrates a perspective view of one embodiment of a vehicle dash 46, the location of which is illustrated in FIG. 2. As seen in FIG. 3, the vehicle dash 46 is disposed adjacent to the center console 36 and to a shift knob 48 which extends from the center console 36. The center console 36 is generally located in a middle area between the driver side location 30 and the passenger side location 32. The center console 36, which includes the shifter assembly 34, is positionable along the direction 40 to move the center console 36 in one direction or the other depending on the desired location.

The center console 36 supports the shifter assembly 32 within a housing 50. A user accessible handle 52 is located and accessible at a bottom portion 54 of the housing 50, which is configured to surround the handle 52. The user accessible handle 52 is accessible by either individual located in one of the driver side location 30 and the passenger side position 32. Movement of the handle 52 from a first position to a second position enables movement of the console 36 along the direction 40 in either direction. In one position, the handle 52 fixes or locks the console 36 in place with respect to the dash 46 and in the other position releases the console 36 for movement along the direction 40. In one embodiment, the console 36 is supported by and moves on a rail structure 56 in response to a force applied by one of the passengers to move the console from side to side. If the wheelchaired passenger is to be located in the location 32, then the console 36 is moved toward the driver side location 30 to provide sufficient space for locating the wheelchair in the front passenger area. Once the console 36 is located as desired, the handle 52 is moved to the other of the first position or second position to fix the location of the console 36, so that further movement along the direction 40 is substantially prevented until the handle 52 is again moved.

Figure 4:
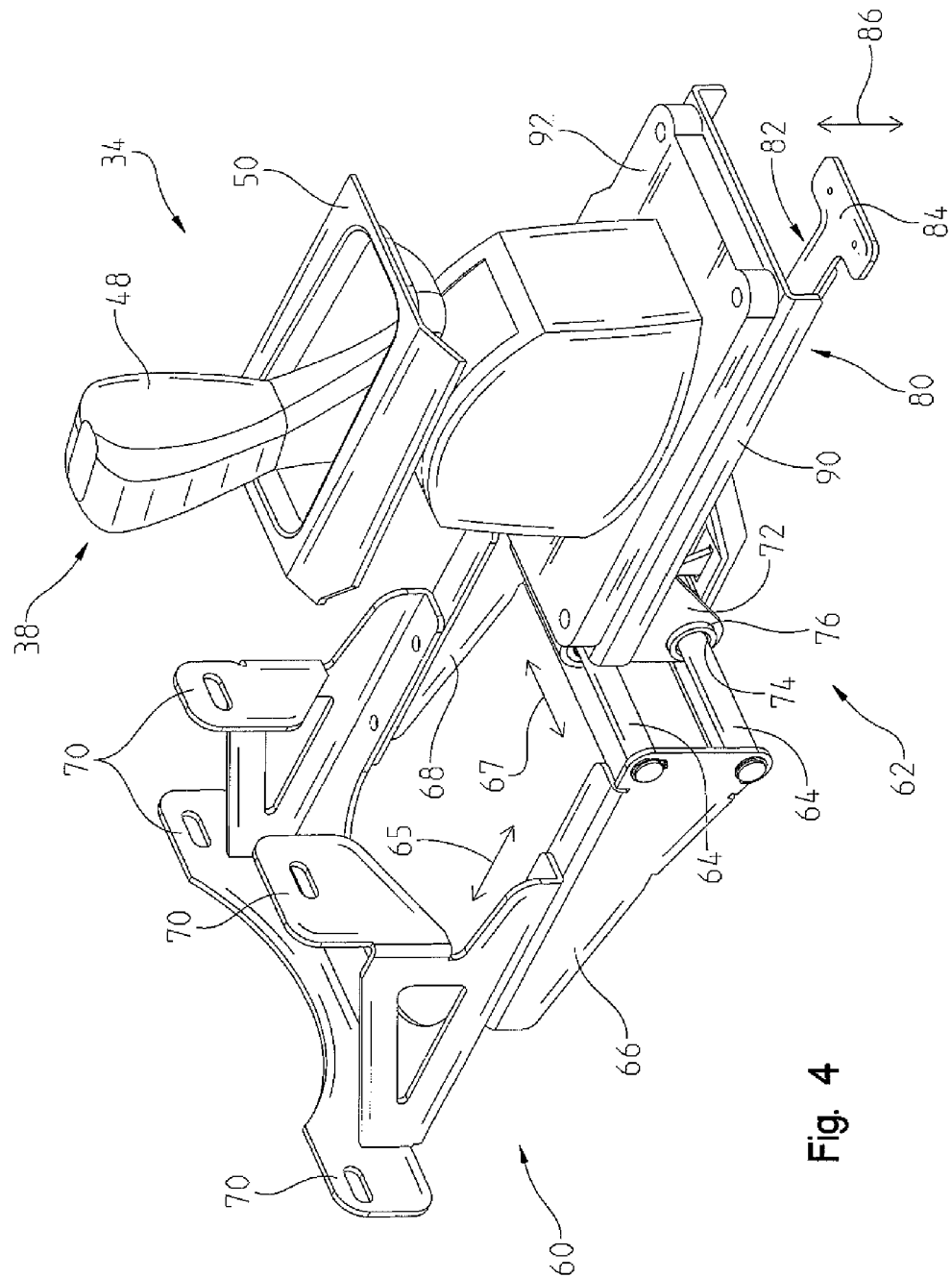
FIG. 4 illustrates a perspective view of a positionable shifter assembly including a shifter.

FIG. 4 illustrates one embodiment of the positionable shifter assembly 34 including the shifter 38, with the shift knob 48, and a portion of the housing 50, the majority of which is not shown to illustrate the shifter assembly 34. The assembly 34 includes a bracket assembly 60 operatively coupled to a carriage assembly 62. The carriage assembly 62 is configured to move on one or more rails 64 which extend from a first side 66 to a second side 68 of the bracket assembly 60. The bracket assembly 60 further includes a plurality of feet 70 which are configured to engage a supporting structure located at or behind or the dash 46 of the vehicle 10. While the rails 64, as illustrated, are depicted as having a round cross-section, other embodiments include other cross-sections such as rectangular, oval, or square, such as the rails 56 of FIG. 3. In one embodiment, the bracket assembly 62 defines a first axis 65 which extends generally along a length of the bracket assembly 62 and the rails 64 define a second axis 67, generally perpendicular to the first axis. In this embodiment, the carriage assembly 62 moves generally parallel to the dash 46.

The carriage assembly 62 includes first and second supports 72 (see also FIG. 6) one or both of which are configured to engage one of both of the rails 64. In one embodiment, each of the first and second supports 72 includes one or more apertures 74 including an insert or sleeve 76 which circumscribes the rail 64. The insert 76, in different embodiments, is formed of a low friction material to promote ease of movement of the carriage assembly 62 along the rails. In other embodiments, the insert 76 is not present, and the rail directly engages the supports 72. In one or more embodiments, the sleeve 76 includes a bearing or bearing bushing.

Each of the rails 64 includes a length which is greater than the distance between the first and second supports 72 such that the carriage assembly 62 is positionable between the first side 66 and the second side 68 during reciprocal movement thereof. In one embodiment, the distance between the first side 66 and the second side 68 is about four (4) inches and permits an extent of movement of the carriage assembly 62 of about 4 inches. In other embodiments, the travel distance of the carriage assembly 62 with respect to the bracket assembly 60 is selected to achieve a desired travel distance within the constraints provided by the configuration of the vehicle 10. In other embodiments, a single rail is used.

A securing mechanism 80 is operatively connected to the carriage assembly 62 to secure the carriage assembly 62 at a desired location with respect to the bracket assembly 60. In one embodiment, the securing mechanism 80 includes a lever 82 having an end portion 84, which in the embodiment of FIG. 3, is covered by the handle 52. As used herein, the term "lever" includes levers of different types. The end portion 84 is movable from a first position to a second position along the direction 86 to release the carriage 62 for reciprocal movement along the rails 64 and to fix the position of the carriage assembly 62 with respect to the rails 64. The direction 86 is used to illustrate an up and down movement of the lever 82 in a direction, which in different embodiments, is generally linear or which is curved, for instance when the lever 82 moves about an axis of rotation. In other embodiments, other securing mechanisms to adjustably locate the carriage assembly 62 with respect to the bracket assembly 60, move along the axis 65.

Figure 5:
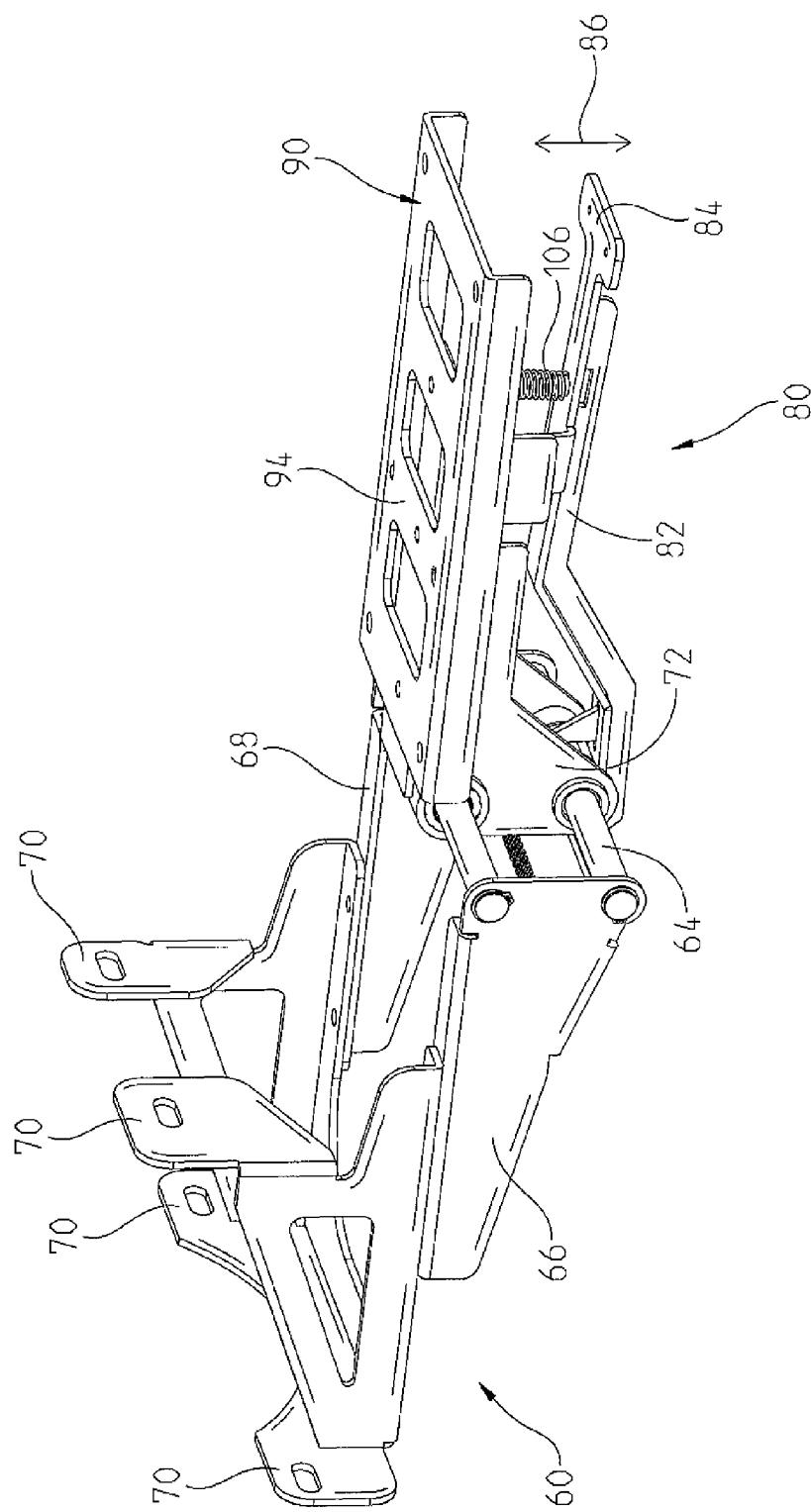
FIG. 5 illustrates a perspective view of a positionable shifter assembly lacking a shifter.

The carriage assembly 62 further includes a support 90 which is operatively connected to the shifter 38, and in particular to a base 92 of the shifter 34. As seen in FIG. 4, the support 90 is configured to couple to the base 92 through one or more apertures configured to receive connectors (not shown). As illustrated in FIG. 5, the support 90 is coupled to the first and second supports 72, which in turn are supported for movement with respect to the bracket assembly 60. The feet 70 are generally perpendicular to a plane defined by a support surface 94 of the support 90. Consequently, coupling of the feet 70 to an appropriate support structure of the vehicle 10 locates the support surface 94 generally parallel with the floor of the vehicle 10, either when stationary or during movement of the carriage assembly 62 between the first side 66 and second side 68 of the bracket assembly 60.

Figure 6:
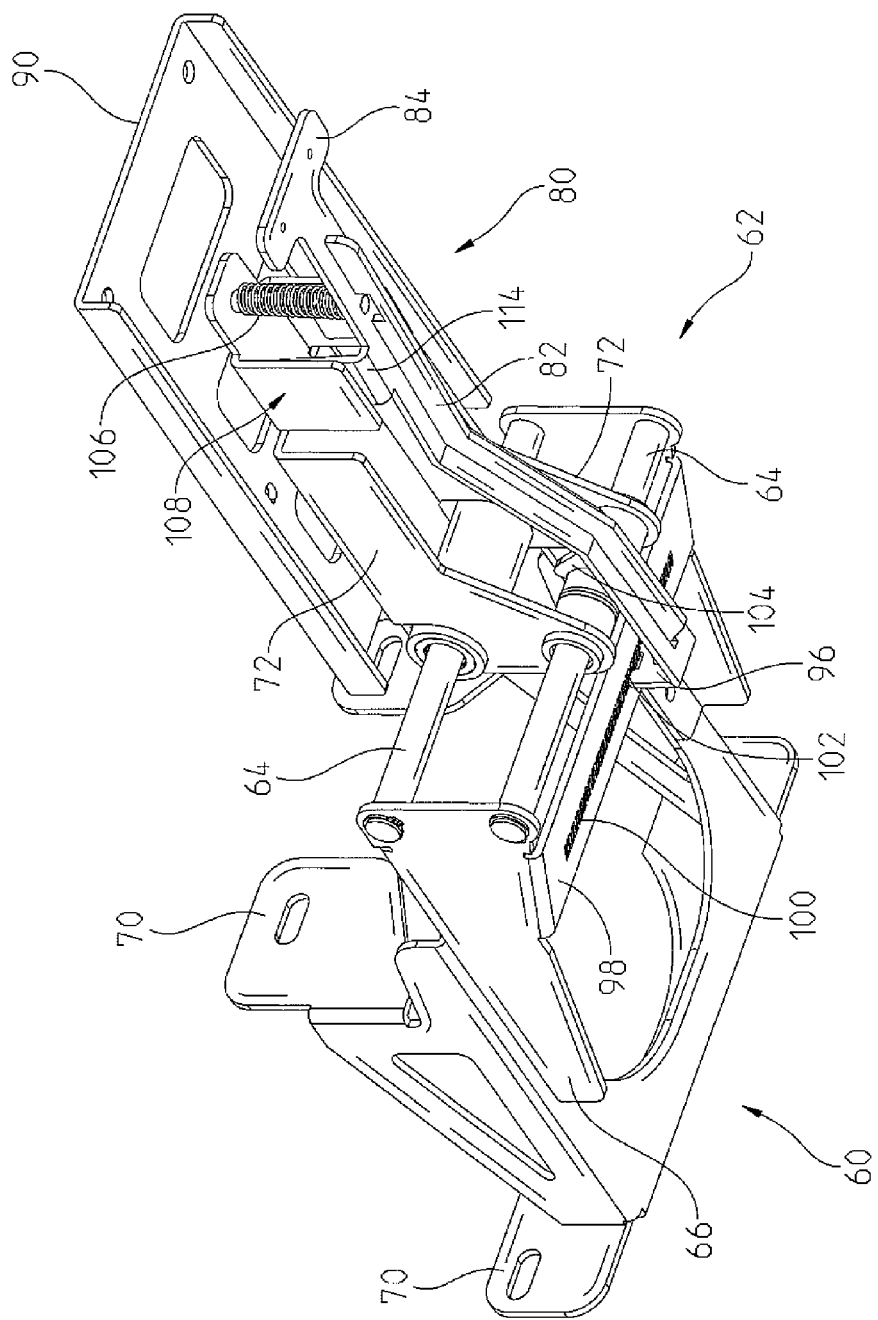
FIG. 6 illustrates an underneath perspective view of a positionable shifter assembly.
Figure 7:
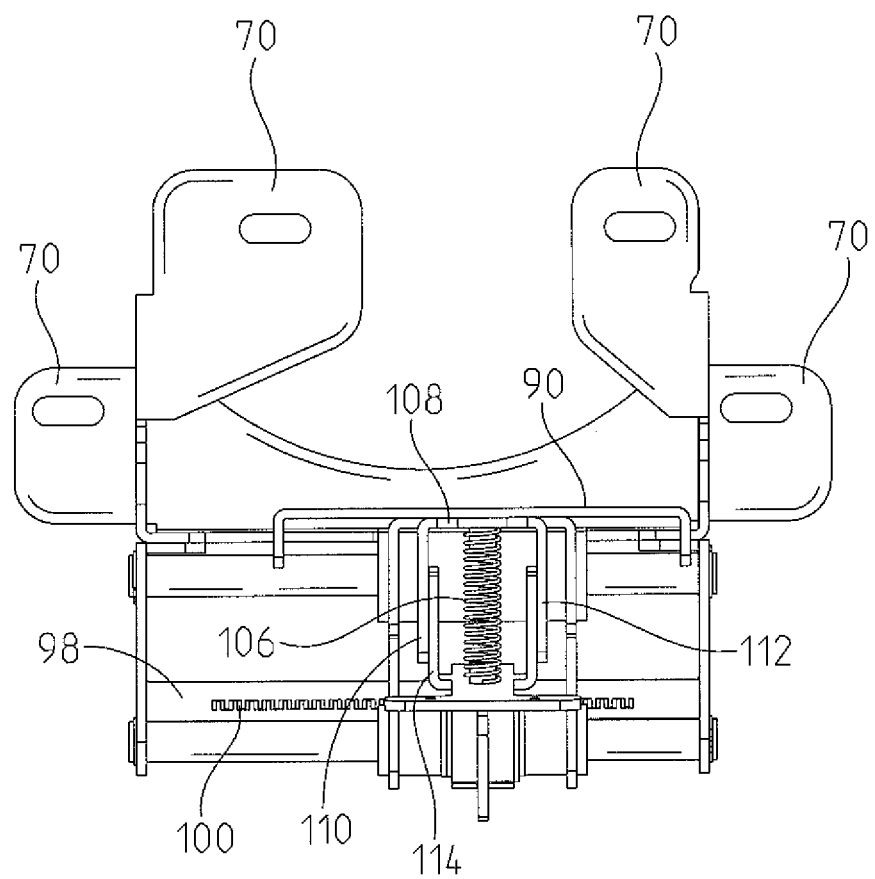
FIG. 7 illustrates a front elevational view of a positionable shifter assembly.

As illustrated in FIG. 6, the lever 82 of the securing mechanism 80, which terminates at one end with the end portion 84, terminates at another end 96 configured to engage a locating strip 98 including a plurality of indentations 100 to provide a friction brake. In one embodiment, the end 96 includes one or more projections 102 configured to engage the indentations 100. The securing mechanism 80 includes a coupler 104 which operatively connects a portion of lever 82 (located between the ends 84 and 96) such that the lever 82 is pivotable about the rail 64 closest to the locating strip 98. Consequently, movement of the end 84 in a direction toward the support 90 disengages the projections 102 from the indentations 100 to release the carriage assembly 62 from its fixed position. A resilient member or spring 106, disposed between the lever 82 and the bracket 90, which keeps the projections 102 in contact with the indentations 100, is compressed during this movement. Once the carriage assembly 62 is moved to the desired location, a release of the end 84 reengages the projections 102 with the indentations 100 under expansion of the spring 106. In another embodiment, the spring 106 is absent and is replaced by a torsion spring located at the rail 64 and the lever 82. Other embodiments include other types of springs, including leaf springs The carriage assembly 62 includes a locator 108 which is connected to the support 90 and includes a first part 110 and a second part 112 as seen in FIG. 7. The first part 110 and second part 112 extend downward and away from the support 90. The first part 110 and 112 define a space therebetween configured to receive a corresponding U-shaped bracket 114 extending from the lever 82. The U-shaped bracket 114 moves toward the support 90 during compression of the spring 106 and limits upward and sideward movement of the lever 82 with respect to the locator 108. In this configuration, therefore, repeated engagement and disengagement of the projections 102 with the indentations 100 remain relatively consistent during the useful life of the shifter assembly 34.

Figure 8:
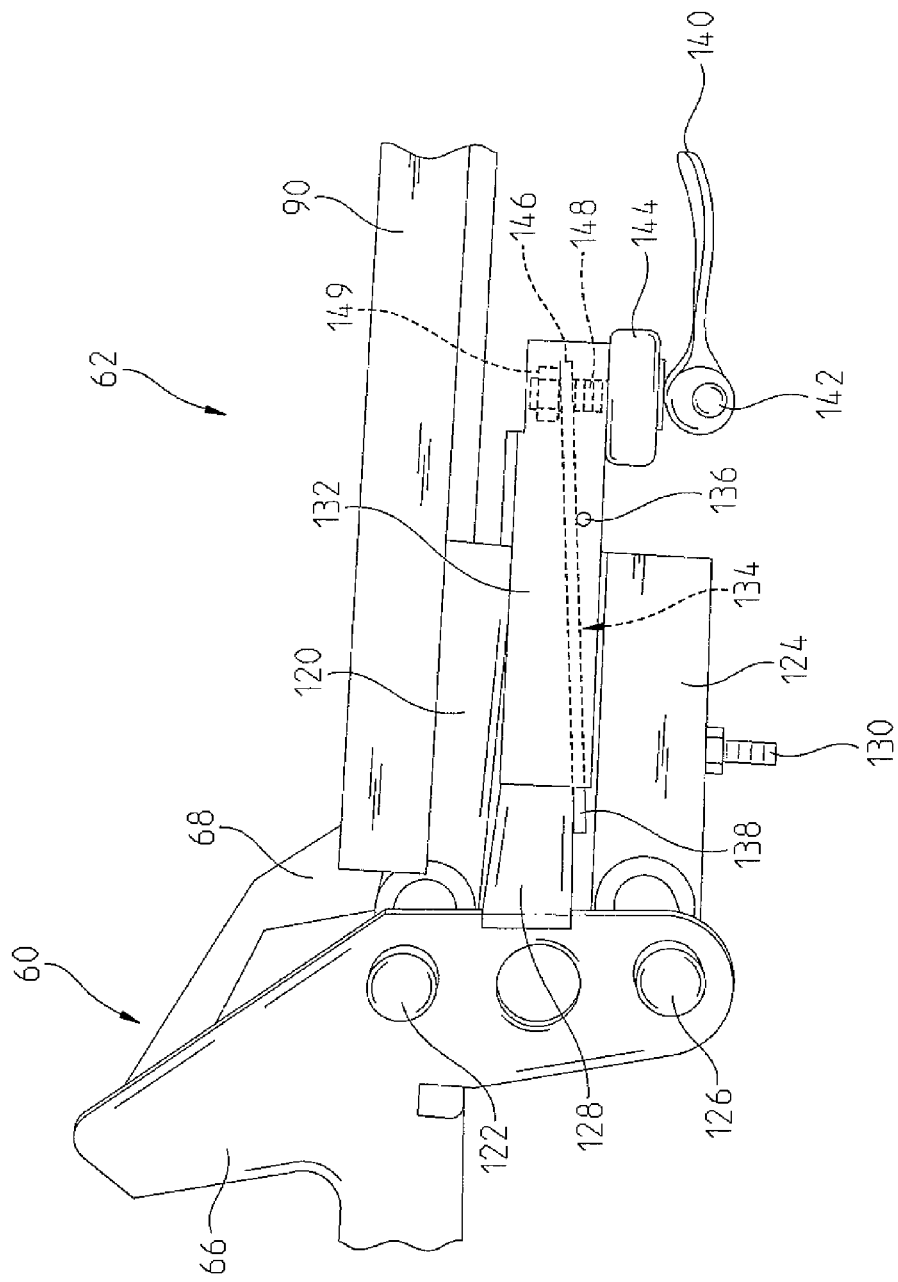
FIG. 8 illustrates a side elevational view of another embodiment of a positionable shifter assembly.

FIG. 8 illustrates another embodiment of the carriage assembly 62 including the support 90. In this configuration, a first support 120 is coupled to the support 90 and engages a rail 122 and a second support 124 engages a second rail 126. A contact plate 128 is located between the first rail 122 and the second rail 126 and extends from one side bracket to another side bracket of the bracket support 60. The first support 120 and the second support 124 are coupled together with a connector 130 through a third support 132. In one embodiment, the third support 132 is a rectangular tube in which a brake plate 134 is located and which pivots about or rests on a pin 136 extending through the interior thereof. In other embodiments, the first support 120, second support 124 and third support 132 are combined together to from a single unitary part, two parts or more than three parts.

A first end 138 of the brake plate 134 is located adjacently to the contact plate 128, and upon movement of the brake plate 132 about the pin 136, the brake plate 134 is moved into and out of engagement with the contact plate 128. Movement of the brake plate 134 is provided by a lever 140 having a cam end 142 which engages a compressible spacer 144. Another end 146 of the brake plate 134 is coupled to a rod 148 which is also operatively connected to the lever 140. The end 146 is fixed to the rod 148 such that up and down movement of the rod (as illustrated) moves the end 138 into and out of contact with the contact plate 128. Therefore, movement of the lever 140 about an axis of the cam end 142 moves rod 148 and therefore the end 138 to fix the location of the carriage assembly 62 once located at a desired position. A stop 149, such as a nut, is fixedly coupled to the rod 148 to substantially prevent movement of the brake plate 134 along the rod 148, in at least one direction. Upon actuation of the brake plate 134, a bending moment is provided at the pin 136 to engage the end 138 at the contact plate 128. The axis of rotation of the cam end 142 is offset such that the cam end 142 compresses the spacer 144 in one position and decompresses the spacer 142 in another position. In the position illustrated, the cam end 142 has compressed the spacer 144 and the end 138 is held relatively securely in contact with the contact plate 128 to fix the location of the carriage assembly 62 with respect to the bracket 66.

Figure 9:
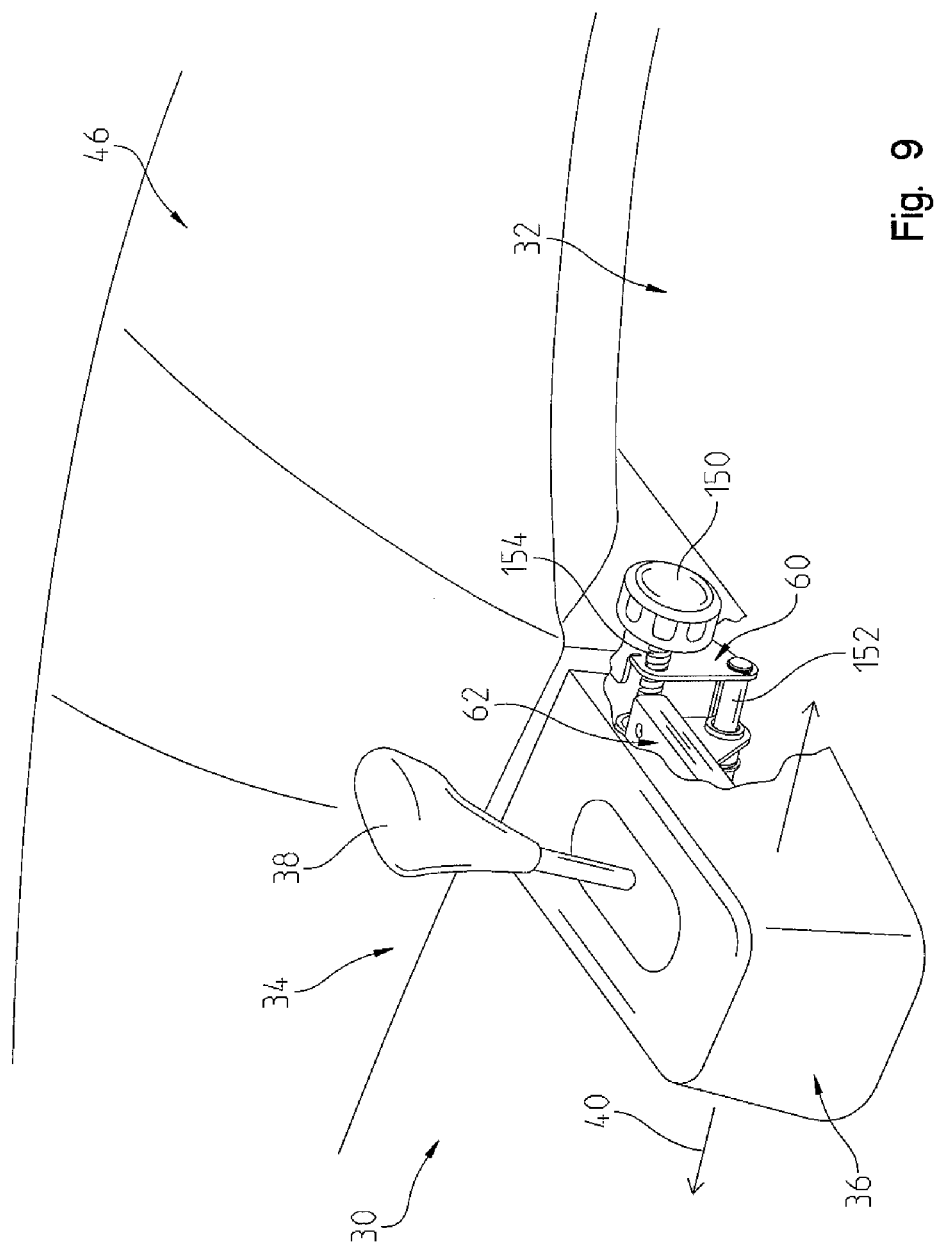
FIG. 9 illustrates a perspective view of another embodiment of a positionable shifter assembly.

FIG. 9 illustrates another embodiment of the positionable shifter assembly 34 including a center console 36 and a shifter 38. In this embodiment, the shifter assembly 34 is configured to move in either direction along the line 40 upon rotation of a knob 150, which is a type of lever. In this embodiment, one or both of the bracket assembly 60 and carriage assembly 62 includes a rail 152 and a threaded rod 154. The threaded rod 154 is operatively connected to a threaded portion of the carriage assembly 62 (not shown), such that rotation of the knob 150 moves the carriage assembly 62 with respect to the bracket assembly 60. In other embodiments, the knob 150 is replaced with an electrical drive system which moves the carriage assembly 62 with respect to the bracket assembly 60 using electrical power. In one embodiment, the knob 150 is replaced with a pushbutton and a motor is added, whereupon activation of the pushbutton drives the motor which rotes the threaded rod.

While exemplary embodiments incorporating the principles of the present invention have been disclosed herein, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A positionable shifter assembly for supporting a shifter in a front passenger compartment of a vehicle comprising:
   a bracket assembly configured to be stationarily fixed in the front passenger compartment of the vehicle, the bracket assembly defining a first axis;
   a carriage assembly operatively connected to the bracket assembly, the carriage assembly adapted to support the shifter for movement along a second axis inclined with respect the first axis; and
   a securing mechanism, operatively connected to the carriage assembly, the securing mechanism configured to secure the carriage assembly to the bracket assembly at a desired location along the second axis.

2. The positionable shifter assembly of claim 1 further comprising a carriage support operatively connected to the bracket assembly and to the carriage assembly, wherein the carriage support is configured to support the carriage assembly for reciprocal movement along the second axis with respect to the bracket assembly.

3. The positionable shifter assembly of claim 2 wherein the carriage support includes at least one rail aligned along the second axis and the carriage assembly includes a coupler configured to engage the rail such that the carriage assembly is movable along the rail.

4. The positionable shifter assembly of claim 3 wherein the securing mechanism includes a locking feature configured to fix the position of the carriage assembly with respect to the bracket assembly.

5. The positionable shifter assembly of claim 4 wherein the locking feature includes a lever.

6. The positionable shifter assembly of claim 5 wherein the locking feature includes a cam.

7. The positionable shifter assembly of claim 5 wherein the locking feature includes a knob.

8. The positionable shifter assembly of claim 5 wherein the lever includes a lever arm including a first end accessible to a user of the vehicle and a second end rotatably coupled to one of the rail and the carriage assembly.

9. The positionable shifter assembly of claim 8 wherein the lever arm includes an engagement portion configured to engage one of the bracket assembly and the rail to fix the position of the carriage assembly with respect to the bracket assembly.

10. The positionable shifter assembly of claim 9 wherein the bracket assembly is configured to be coupled to a frame of a vehicle center console.

11. The positionable shifter assembly of claim 10 further comprising a housing coupled to the carriage assembly, the housing including an aperture to receive a shifter handle of the shifter assembly.

12. A shifter assembly for use in a vehicle adapted to transport a physically limited person, wherein a front passenger compartment includes a dashboard, a driver side compartment, a passenger side compartment, and a vehicle shifter disposed between the driver side compartment and the passenger side compartment, the shifter assembly comprising:
   a shifter support assembly including a platform configured to support the shifter, wherein the platform is configured to be positioned at a plurality of locations within the vehicle; and
   a securing mechanism, operatively connected to the shifter support assembly, the securing mechanism configured to secure the shifter support assembly at one of the plurality of locations within the vehicle.

13. The shifter assembly of claim 12 wherein the shifter support assembly includes a first member configured to be operatively connected to the vehicle at a fixed location in the front passenger compartment, and a second member operatively connected to the platform and to the first member, wherein the second member is configured to be positionable with respect to the first member.

14. The shifter assembly of claim 13 wherein the securing mechanism is configured to move between a first position and a second position, wherein in at least one of the first position and the second position the second member is fixed with respect to the first member such that the shifter is stably located within the front passenger compartment.

15. The shifter assembly of claim 14 wherein first member defines a first axis and the second member defines a second axis generally perpendicular to the first axis and the first position and the second position are aligned along the second axis.

16. The shifter assembly of claim 15 wherein the securing mechanism includes a pivot about which the securing mechanism moves between the first position and the second position.

17. The shifter assembly of claim 16 wherein the securing mechanism comprises a lever.

18. The shifter assembly of claim 17 wherein one end of the lever engages the first member in one of the first and second position and the other end of the lever includes a user accessible portion configured enable a user to adjust and to fix the location of the shifter in the front passenger compartment.

19. The shifter assembly of claim 17 wherein the lever comprises a knob.

20. The shifter assembly of claim 17 wherein the securing mechanism comprises a screw drive operatively coupled to the knob, wherein rotation of the knob moves the second member with respect to the first member.

* * * * *